Edwin G. Steele, INVENTOR

Patented Aug. 31, 1937

2,091,772

UNITED STATES PATENT OFFICE 2,091,772

GRAVITY REDUCING APPARATUS AND METHOD

Edwin G. Steele, Dallas, Tex.

Application August 23, 1933, Serial No. 686,385

2 Claims. (Cl. 83—46)

This invention relates to apparatus for reducing materials and while the apparatus has many uses, it particularly lends itself to the reduction of ores, rock, coal and similar materials which are capable of disintegration by impact.

One object of the invention is to improve the construction and mode of operation of reducing apparatus and so to construct such apparatus that a more rapid and complete reduction of materials may be effected at less power cost than is possible with any apparatus with which I am familiar.

In carrying out the ordinary methods of reduction of ores, rock and similar material, the reduction is accomplished by first subjecting the material to be reduced, (generally in large pieces), to the action of a rock breaker. The broken material is next operated upon by an intermediate crusher which further reduces the material and fits it for introduction to a ball mill where the final grinding takes place. The ground material is next subjected to machines for removing the dust and grading for subsequent treatment.

A feature of the present invention consists in the provision of a novel construction and arrangement of parts whereby the reduction, drying, aspirating and separation of the reduced material may be accomplished in a single apparatus as distinguished from plants as generally constructed wherein these several operations are performed in separate units, thereby eliminating the several separate units and the machinery necessary to transfer the material being operated upon from one to another of said units.

Another feature of the invention and a very important one, resides in the provision of novel apparatus which, while it will prepare materials for use in connection with either a wet or dry milling process and the various apparatus used in connection therewith, particularly lends itself to the dry reduction of material for wet milling processes. Ordinarily materials when being prepared for use in connection with wet milling processes, are reduced by a wet reducing process. Dry reducing processes are more desirable, however, for the reason that some materials at least, especially certain ores and rock, break more readily when dry. Furthermore, the wear and tear on machinery is less when operating upon dry materials and again, material when in a wet state, increases in weight and consequently requires more power in its handling. In the present apparatus the material is reduced in a dry state and if desired for use in a wet milling process, the required amount of moisture may be added after the reduction has been completed.

Still another feature of the invention resides in a novel arrangement whereby a dry reducing apparatus is rendered dustless in operation, even though it does not employ the usual dust collecting system necessary when the same work is performed by a multiplicity of units.

Still another feature of the invention resides in the provision of a novel arrangement of parts whereby the material operated upon may be reduced to any desired size without material change in the apparatus employed.

Still another and very important feature of this invention resides in a novel construction and arrangement of parts whereby such material as has been reduced to desired size is separated from the material being operated upon almost immediately it has attained the desired size and prior to the introduction into the reducing portion of the apparatus. This is important since it prevents such material as has been reduced to the desired size, again passing through the apparatus and its consequent reduction to an undesirable degree. Also, it prevents excess dust and reduces waste of material to a minimum.

Certain other features of the invention relate to novel constructions and methods of operation whereby the sliming of the material being operated upon, and particularly the sliming of the sulphide values thereof is reduced to a minimum.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings, and the following detailed description of the constructions therein shown.

For purposes of illustration, I will describe the invention as an apparatus for reducing ores, although in so doing, it is to be understood that the invention may be effectively embodied in apparatus for reducing any material capable of disintegration by impact and that the invention is not to be limited to the treatment of any particular material.

In one of its more simple embodiments, the apparatus consists of a reducing chamber A and a charging stack B, the latter serving to charge the reducing chamber with the material being operated upon.

Suitable means, such as a conveyor C may be employed to discharge the reducing chamber and this conveyor is so arranged as to deliver such material as is discharged from the reducing chamber to means for feeding the charging stack B, which means is herein illustrated as an elevating conveyor D.

In the operation of the apparatus, it is intended that the material being operated upon be moved in the form of a continuous stream, the same being elevated by the charging stack feeding means D to the upper end of the charging stack B through which it passes to the reducing chamber A in which the major reduction is effected, after which the oversize material is discharged upon the conveyor C which in turn delivers it to the charging stack feeding means D, in order that the said oversize material may again be operated upon.

The reducing chamber A may be of any desired shape or form but must be of sturdy construction in order to withstand the stresses and strains to which it is subjected in the carrying out of the reduction process.

In the following description and in the claims, the term oversize material is intended to include all material which has not been reduced to the desired degree.

Figure 3:
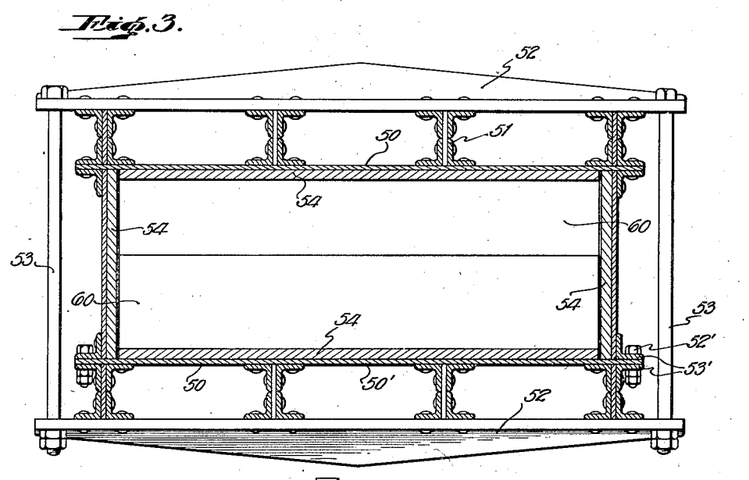
Figure 3 is a horizontal sectional view on an enlarged scale illustrating a preferred form of reducing chamber construction.

In Figure 3 of the drawings, I have illustrated in cross-section one form of construction which I may employ in a reducing chamber. In said figure, the reducing chamber is of rectangular cross-sectional form, the sides 50 of which may be reinforced by the addition of angle irons 51 and bracing elements 52 which latter are preferably connected by tie rods 53. Plates 54, preferably of relatively thick metal are mounted upon the inner faces of the side walls of the reducing chamber in such a manner as to form a lining therefor, which lining is preferably removable to provide for replacement as occasion may require. One side of the reducing chamber, as for example that side designated 50' in Figure 3, may be secured in position by bolts 52' which pass through angle irons 53'. By this construction, removal of the bolts 52' and the rods 53 will permit of the bodily removal of the side 50' to provide access to the interior of the reducing chamber.

Figures 1, 2:
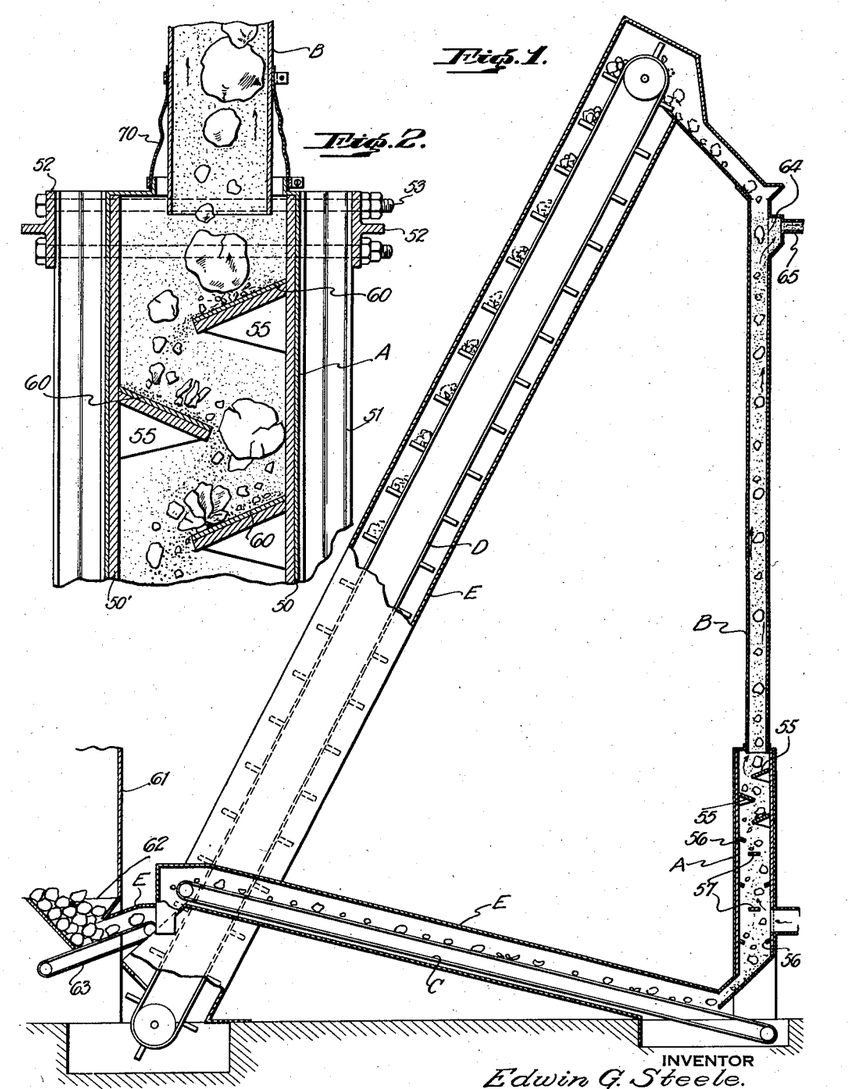
Figure 1 is a view in elevation, partly in section of an apparatus constructed in accordance with the present invention.
Figure 2 is a fragmentary longitudinal sectional view on an enlarged scale illustrating one form of breaker plate arrangement and the connection between the reducing chamber and charging stack, the view being upon an enlarged scale.

Within the reducing chamber A, I provide a plurality of breaker plates upon which the material is projected upon its introduction into the reducing chamber. In Figure 1 of the drawings I have illustrated three different types of breaker plates they being designated 55, 56 and 57. The breaker plates 55, of which there are three shown in this form, project from opposite side walls of the reducing chamber and extend to a point substantially at, or slightly beyond the longitudinal center of the reducing chamber. In Figure 1, I have illustrated three breaker plates 55 arranged in staggered relation in the upper portion of the reducing chamber and while they are illustrated as inclined, it is to be understood that the angle of inclination will be less than the angle of rest, thereby providing shelf-like structures upon which certain of the material being operated upon will be temporarily retained for a purpose to be hereinafter more specifically described.

The breaker plates 56 are preferably inclined similarly to the breaker plates 55. These breaker plates 56, however, are not as wide as the breaker plates 55 and consequently do not project from the side walls of the reducing chamber to the same extent as do the breaker plates 55.

The breaker plates 57 are preferably in the form of narrow bars centrally disposed with respect to the side walls of the reducing chamber and they are interposed between the sets of breaker plates 56 as illustrated in Figure 1.

As best illustrated in Figure 2, each breaker plate may be provided upon its striking face with a wear plate 60 which may be constructed in such a manner as to be removable for repair or replacement as occasion may demand.

This embodiment of the invention is particularly adapted for use in the reduction of materials to finely divided form such as powder and its operates in the following manner.

The material to be operated upon is supplied to the upper end of the charging stack B, by elevating conveyor D, preferably in the form of a continuous stream. The material in its initial introduction into the apparatus consists preferably of relatively large pieces combined with fines, say from 8" to zero. Upon introduction into the charging stack this material falls by the action of gravity, through the charging stack and is precipitated with considerable force against the several breaker plates in the reducing chamber A. After striking the first breaker plate the material bounds and rebounds from breaker plate to breaker plate, striking the several breaker plates and the side walls of the reducing chamber until it passes out the lower end thereof.

As the material is discharged from the charging stack onto the upper breaker plate 55 in the reducing chamber, the impact will serve to shatter and partially reduce at least a portion of the material. This reduction of the material by impact with the breaker plates is further augmented by reason of the fact that the material in its fall will be momentarily retarded when it strikes the upper breaker plates of the reducing chamber and the following material, which is in relatively large pieces, will be precipitated onto this momentarily retarded material with sufficient force to effect a further reduction thereof by crushing.

In its travel through the charging stack B, the pieces of material will also be subjected to a certain degree of reduction by reason of a grinding action resulting from the several particles contacting with one another in their fall.

I will not attempt herein to give any specific dimensions as to the length or height of the charging stack or reducing chamber, or the number, slope or width of breaker plates since these several features vary with the character of material being treated. For example, assuming that a fall of ten (10) feet will gradually reduce coal to a powder and that a fall of forty (40) feet will be required to gradually reduce a tough or springy ore, then at some intermediate point will be the correct fall for those materials having intermediate crushing or reducing characteristics. Therefore, in the operation of the apparatus herein disclosed, there is a critical height or fall to which the pieces of material must be subjected to attain efficient reduction, which critical height depends upon the characteristics of the material being treated and which varies in the treatment of different materials.

In most instances, however, the charging stack and reducing chamber will be of such length that there will be a natural updraft of air therethrough and I avail myself of this natural draft in the following manner.

As heretofore stated, that form of the invention which is now being described is particularly adapted to the reduction of material to a fine powder and it is intended that in this form of apparatus, the material will be reduced to such a degree as to be readily carried in suspension in this natural up draft to the top of the charging stack or closely adjacent thereto, where it may be discharged through an outlet 64 and disposed of in any manner desired through a conveyor 65 herein illustrated as a pipe.

In some instances, however, for example where the size of the finally reduced material is such that the natural up draft through the reducing chamber and charging stack will not carry the material in suspension, or where the material in its passage through the feeding stack, produces a down draft, an induced up draft may be provided by coupling to the pipe conveyor 65, a fan, aspirator or other similar draft inducing apparatus. Under these conditions, the induced up draft will be sufficient to overcome what down draft may be produced by the material in its fall and blowing out through the bottom of the reducing chamber prevented. Furthermore, by proper regulation of this induced draft, the size of the reduced material taken from the stream of material being operated upon may be regulated to a nicety.

This feature of taking out of the stream of material being operated upon, such material as has been reduced to the desired degree, at a point in the charging stack, I consider important, since it has many advantages over other devices where the reduced material is taken off at lower levels, as will now be explained.

By taking off the reduced material at the point described the immediate removal of such material as has been reduced to the predetermined size is assured and the production of excess of extreme fines when the apparatus is used to reduce material to sizes larger than dust, is thus prevented. Furthermore, when the material is taken off at this point, it insures the collection and removal of such material as may have been reduced to desired size by grinding contact of the pieces of material in transit from the discharge end of the reducing chamber to the feed end of the charging stack thus preventing them again passing through the apparatus which would result in their further reduction to an undesirable degree.

Still another advantage gained in this taking off of the finally reduced material from the charging stack is that where the reduced material is to be operated upon by other apparatus, it is not necessary to have expensive and ponderous machinery for elevating it to a feeding position since it is already at a height where it may be fed by gravity or relatively short conveyors to the feed of machines for subsequent operation thereon.

Figure 5:
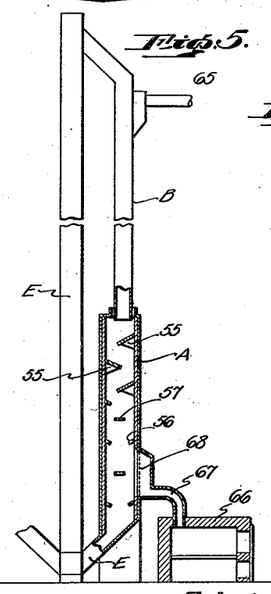

In addition to serving as a means for conveying off the reduced material, this up draft or current of air produces an appreciable drying effect upon the material being treated and in some instances, this up draft may be augmented and its drying efficiency greatly enhanced by the introduction of heat from a furnace such as illustrated in Figure 5. In this figure, the furnace is designated 66 and its chimney or stack 67 may discharge directly into the lower portion of the reduction chamber A as at 68.

As the air and gases ascend through the reducing chamber and charging stack against the falling stream of material the surfaces of the several pieces will be effectively dried and as the oversize material will make repeated trips through the stack to effect a reduction in size of the pieces thereof, and since after each passage of the pieces through the apparatus new surfaces result from fracture of the pieces, a thorough drying of the material will be effected.

The lower end of the reducing chamber is closely adjacent the conveyor C and this conveyor does in effect serve to discharge the material from the reducing chamber since it moves the material away from the discharge opening thereof.

Such material as has not been reduced to the desired degree in its passage through the charging stack and the reducing chamber is again delivered to the charging stack feeding means D and again precipitated through the charging stack to the reducing chamber for further treatment, and it is to be understood that in the preferred method of operation this oversize material will be repeatedly passed through the charging stack and the reducing chamber until the desired reduction has been effected.

As heretofore stated, in the preferred method of operation the stream of material being operated upon is what might be termed continuous. Inasmuch as partial reduction in the size of the pieces of material takes place with each passage thereof through the charging stack and the reducing chamber, unless some provision were made to supply large pieces to the stream, the crushing action resulting from the impact of larger pieces upon smaller pieces either at rest upon, or retarded by the breaker plates of the reducing chamber, would diminish as the size of the particles is reduced.

I therefore provide means for introducing into the stream large pieces of material from time to time, as the condition of material in the stream may indicate as necessary. In the present embodiment of the invention, i. e., as illustrated in Figure 1 of the drawings, I have provided a bin 61 having a hopper bottom 62, which discharges large pieces of material upon a conveyor 63, which in turn discharges directly onto the charging stack feeding means D. By this means, large pieces of material may be from time to time introduced into the stream of material being treated, it being understood of course that a suitable means for controlling the discharge of material from the bin 61 will be provided.

In some instances, for instance where the material operated upon has, as one of its characteristics, a multiplicity of fracture or contact planes, it may be that the reduction in size of the larger pieces will be effected at too rapid a rate to make for efficient reduction of the material to the desired degree. A heavy mineralized ore is one good example of such a material, and when such a material is treated as heretofore stated, it sometimes happens that the larger size pieces will, upon their first impact, shatter into several smaller pieces which, although of oversize, are not sufficiently large or heavy to effect further reduction by crushing when subsequently passed through the apparatus.

To gain a high efficiency of reduction when treating such materials, I may combine with the material being treated a desired quantity of relatively large pieces of a considerably harder material than that being treated, of which scrap iron is one very good example. It is intended that this relatively harder material will form a permanent part of the material being treated when the latter is of the type just mentioned, thus insuring at all times a sufficient number of large pieces of unbreakable material and that the effect of reduction by crushing will not be lost.

Due to the heavy impacts resulting from the precipitation of the material upon the several breaker plates and against the sides of the reducing chamber, the reducing chamber will be more or less violently vibrated. This vibration serves a useful purpose in that it will keep in constant motion such material as lodges on the breaker plates, thus preventing too fine a reduction at these points. To permit of vibration of the reducing chamber independently of the charging stack, the coupling between the two should be of a flexible nature and I have, therefore, shown in Figure 2 a conventional form of flexible coupling 70 for connecting these units together.

In some instances, particularly where highly efficient dust collecting systems are in use, it may not be necessary to enclose certain parts of the apparatus such as the charging stack feeding means, the reducing chamber discharging means and the means for introducing new material to the stream. I prefer, however, that all such parts be completely enclosed since it tends to greater efficiency of operation in that better separation and collection of the material is obtained when air drafts, either natural or induced, are employed for this purpose. Furthermore, this enclosing of these parts renders the apparatus practically dust proof in operation, a highly desirable feature, since it makes unnecessary the provision of any further dust collecting system. I have, therefore, shown these several parts enclosed in suitable housings E, which will of course vary in form and size with different installations of the apparatus.

Figure 4:
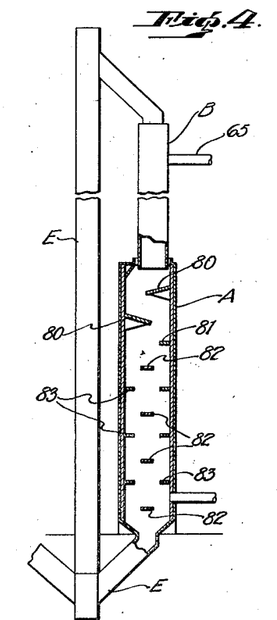
Figures 4, 5 and 6 are views partly in elevation and partly in section illustrating modified forms of breaker plate arrangement.

In Figure 4, I have illustrated a slightly modified form and arrangement of breaker plates within the reducing chamber A, the remainder of the apparatus in this form of the invention being illustrated diagrammatically and partly broken away. In this form of the invention, the reducing chamber has two inclined breaker plates 80 arranged one above the other in the upper portion thereof closely adjacent the discharge end of the charging stack B. These breaker plates 80 project from opposite side walls of the reducing chamber and immediately below the lower breaker plate 80, and arranged upon the side wall of the reducing chamber opposed to the wall by which said lower breaker plate 80 is mounted, there is a breaker plate 81. This breaker plate 81 differs from the breaker plates 80 in that it is narrower than said breaker plates 80 and is positioned in a substantially horizontal plane.

Below the breaker plate 81 there is a breaker plate 82 of relatively narrow form positioned centrally of the side walls of the reducing chamber and suitably supported from the end walls thereof. In this type of reducing chamber, there are preferably four of these breaker plates 82 and they are spaced with respect to each other as illustrated. Projecting from opposite side walls of the reducing chamber and arranged in pairs and in staggered relation with respect to the breaker plates 82, I provide breaker plates 83 similar in construction to the breaker plate 81 heretofore described.

Figure 6:
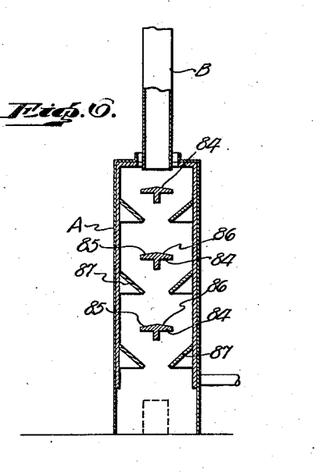

In Figure 6, I have illustrated a still further modified type and arrangement of breaker plates. Referring to this figure, there are three breaker plates 84 disposed centrally of the reducing chamber and arranged in vertically spaced relation. The uppermost breaker plate 84 is so positioned that it receives the material directly from the charging stack B. These breaker plates 84 may be supported in any desired manner from two opposite walls of the reducing chamber and they are preferably T-shaped in cross-section with their top or striking portion formed of two inclined faces 85 and 86, inclined towards the side walls of the reducing chamber.

Carried by the side walls of the reducing chamber A and arranged in pairs in staggered relation with respect to the breaker plates 84, there are inclined breaker plates 87 and the entire arrangement is such that the material in its passage through the reducing chamber will be projected against the several breaker plates and the side walls of the reducing chamber to effect the reduction of the material.

Although in all figures of the drawings I have not specifically shown renewable wear surfaces for the several breaker plates and as a lining for the reducing chamber, it is to be understood that these several elements will be provided with wear plates which will be removable, as heretofore described in connection with the description of that form of the invention illustrated in Figures 1 to 3, inclusive.

Figures 7, 8, 9:
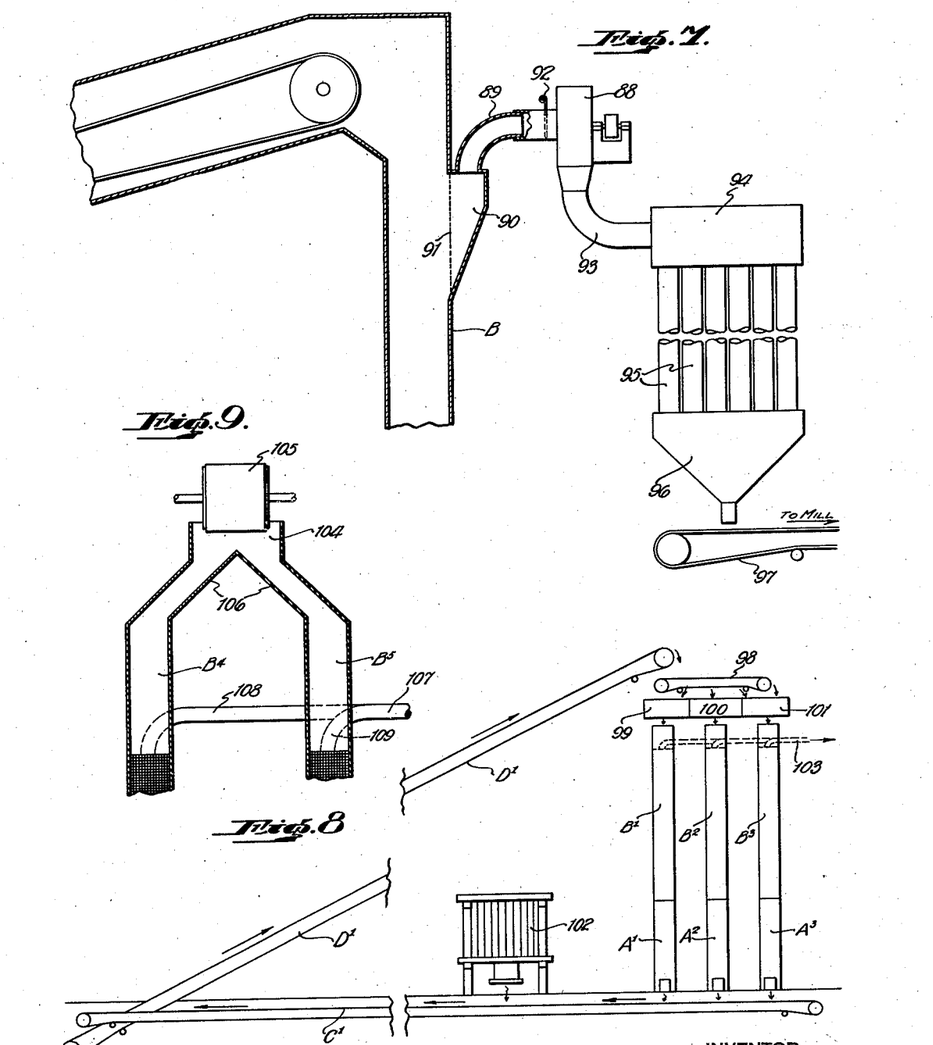
Figure 7 is a view in elevation, partly in section illustrating a modified form of apparatus by which the present invention may be carried out.
Figure 8 is a diagrammatic view illustrating still a further modified form of the invention.
Figure 9 is a detail fragmentary sectional view of a still further modified form of the invention.

In Figure 7, I have shown an apparatus in which reduced material of a larger grade than dust may be separated by means of an air current from the stream of material being operated upon. In said figure, the reference character 88 designates an exhaust fan connected to the charging stack B at a point closely adjacent its feed end. This connection consists of a pipe 89 leading from a fan 88 to a chamber 90, which in turn has direct communication with the interior of the charging stack B through a screen 91. A suitable valve 92 is provided in the pipe 89 and by adjustment, this valve determines the volume of air pulled through the pipe 89 and thereby controls the size of material separated from the stream of material operated upon. For example, if the valve 92 be fully opened, a greater draft of air and consequently a greater pull through the pipe 89 will result than when the valve 92 is partially closed. Obviously, the stronger the draft through the pipe 89, the larger will be the particles separated from the stream of material being operated upon. Thus, by a mere adjustment of the valve 92, the grade or size of the material separated from the stream of material being operated upon can be determined to a nicety.

Leading from the fan 88, there is a pipe 93 which discharges into a header or the like 94. This pipe 93 conveys the separated material into the header 94 from which it passes through separating means in the form of fabric members or bags 95 which permit the escape of air and deposit the reduced material and dust into a hopper-like bottom 96 from which it is discharged onto a conveyor 97 by which it may be conveyed to a mill or other suitable apparatus for further treatment.

In Figure 8, I have illustrated diagrammatically still another form of apparatus which includes a plurality of reducing chambers, $A^1$, $A^2$, and $A^3$. These reducing chambers $A^1$, $A^2$, and $A^3$, receive the material to be reduced from individual charging stacks $B^1$, $B^2$, and $B^3$, which may be supplied from a single distributing conveyor 98 discharging into hoppers 99, 100 and 101. The conveyor 98 is fed by an elevating conveyor $D^1$ which in turn is fed by a conveyor $C^1$. This conveyor $C^1$ serves to discharge the several reducing chambers $A^1$, $A^2$, and $A^3$, and in this form of the invention, the added material is fed to the conveyor $C^1$ from a bin or other suitable supply 102 which discharges onto the conveyor $C^1$ at a point between the reducing chamber $A^1$ and that point where the conveyor $C^1$ discharges onto the elevating conveyor $D^1$. The material which has been reduced to desired size is removed through the medium of the conveyor 103 which is connected to each charging stack near the upper end thereof.

Figure 9 illustrates still a further modified form of apparatus in which two charging stacks $B^4$ and $B^5$ have a single feed opening 104 to which material to be operated upon may be supplied by a single conveyor 105. In this form of apparatus, the upper ends of the charging stacks are so constructed as to provide inclined walls 106 down which the material passes to the charging stacks, the reduced material being taken off near the upper ends of the charging stacks by a single means 107 connected to the charging stacks $B^4$ and $B^5$ respectively by branch pipes 108 and 109.

In Figures 1 to 9, inclusive, the illustrated apparatus is of the type wherein the material is reduced to such size as can be separated from the stream of material being operated upon, by a current of air, either natural or induced.

The invention, however, has other and wider applications and I will now proceed to describe its embodiment in apparatus wherein the material is reduced to sizes which cannot be conveniently or efficiently handled by air currents.

Figures 10, 11:
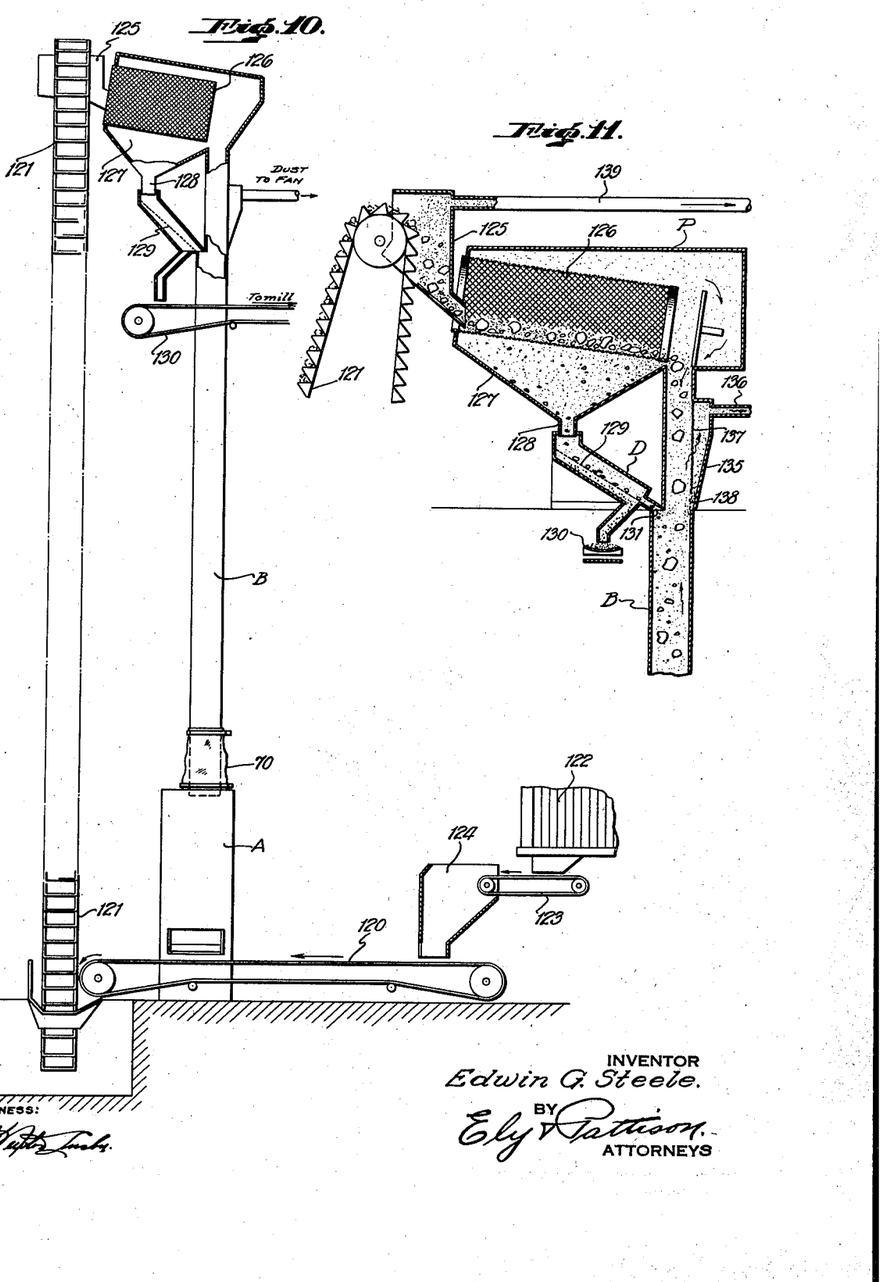
Figure 10 is a view in elevation partly diagrammatic and partly in section illustrating a form of apparatus wherein the separation of reduced material is effected by screening.
Figure 11 is a detail fragmentary vertical sectional view on an enlarged scale of that form of the invention illustrated in Figure 10.

One practical embodiment of such an apparatus is illustrated in Figures 10 and 11 of the drawings wherein I provide means in the form of screens located closely adjacent the feed end of the charging stack B for separating from the stream of material being operated upon, such material as has been reduced to desired size or grade.

In said Figures 10 and 11, the reducing chamber is designated A and the charging stack is designated B. As in the previously described embodiments of the invention, the material to be reduced is precipitated, preferably in a continuous stream, through the charging stack B, onto the breaker plates in the reducing chamber A. The material is discharged from the reducing chamber A upon a conveyor 120 which delivers the same to an elevating conveyor 121. New material in the form of relatively large pieces may be introduced into the stream of material being operated upon by the conveyor 120 which receives such material from a bin or similar supply 122, the bin being discharged by a conveyor 123 which delivers the material to a hopper 124 arranged to feed the conveyor 120.

The elevating conveyor 121 delivers the material being operated upon to a hopper 125 which in turn delivers directly to a relatively coarse mesh screen 126, herein illustrated as of the rotating cylinder type. This screen 126 is employed to separate the extremely large pieces from the stream and deliver them to the upper end of the charging stack B. Such material as passes through the mesh of the screen 126 is delivered to a hopper 127 which delivers it through a spout 128 onto a separating screen 129 herein illustrated as of the flat inclined type.

The screen 129 effects the final separation of the material, the gauge of its mesh determining the size of the finally reduced material. Such material as passes through this screen 129, which material is that in the stream which has been reduced to the desired size or grade, is delivered to a conveyor 130 by which it is delivered to the point desired. Such material as will not pass through the screen 129 is discharged at 131 into the charging stack B, at a point in advance of the introduction to the charging stack of such material as will not pass through the mesh of the screen 126.

The screen 126 serves to by-pass the extremely large pieces of material around the screen 129 preventing damage thereto and in addition, reduces the volume of material passing over the screen 129 thereby making for greater efficiency of this last mentioned screen.

This separation of the material to be again passed through the charging stack and reducing chamber into lots of different grades or sizes and introducing said different lots into the charging stack at different points, I consider an important feature of my invention since it prevents, or overcomes the tendency of the larger pieces to gang together and tends to produce a more equal distribution thereof throughout the stream of material being operated upon. This action insures the presence of larger pieces of material always following smaller pieces in their fall through the charging stack with the result that the larger pieces will be precipitated upon the smaller pieces retarded by, or held at rest upon the breaker plates of the reducing chamber and the desired crushing action will at all times be assured.

Figure 15:
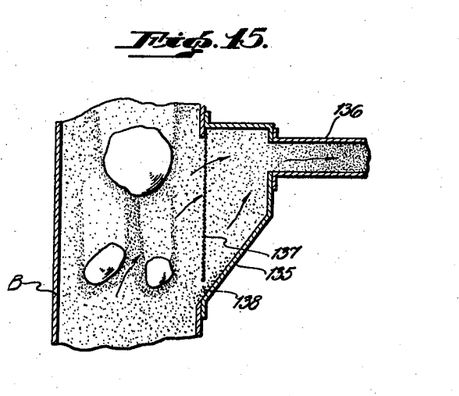
Figure 15 is an enlarged detail sectional view illustrating a preferred type of expansion chamber.

In this type of apparatus, dust and smaller particles may be drawn into a chamber 135 by a draft of air induced in any desired manner through a pipe 136 which leads from the chamber 135. The wall of the chamber 135 which is adjacent the charging stack is preferably formed of screen as indicated at 137, except for an opening 138 at its bottom edge, which opening forms a passage-way through which pieces of material that find their way into the chamber 135 and are too large to be carried away by the air draft, may be again delivered to the charging stack, as more clearly illustrated in Figure 15 of the drawings.

As illustrated in Figure 11, an air pipe 139 may extend from and have communication with the interior of the hopper 125 to collect and carry off dust at this point. This pipe 139 may be connected to a dust collector system or it may be connected to the same means as is the pipe 136 heretofore described.

Figure 12:
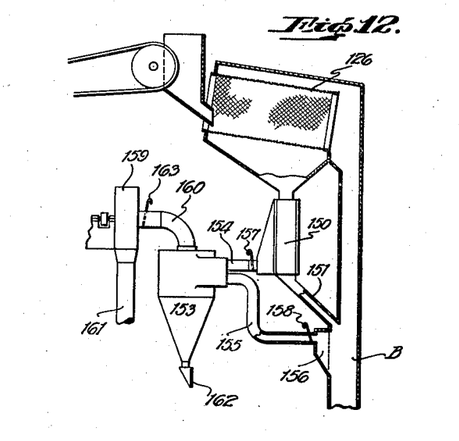
Figure 12 is a fragmentary detail view partly in elevation and partly in section illustrating a modified form of apparatus in which the separation is effected by both air and screening.

In Figure 12 of the drawings, I have illustrated a still further modified form of apparatus which differs slightly from the form illustrated in Figures 10 and 11. In this form illustrated in Figure 12, the reduced material which passes through the screen 126 is subjected to the action of a gravity aspirator 150, the discharge 151 of which leads to the charging stack B and has communication therewith at a point near its upper end. A dust collector 153 is connected as by a pipe 154 directly with the aspirator 150 and by a second pipe 155, to a chamber 156 which in turn has direct communication with the interior of the charging stack B. The connection 154 has a valve 157 and the connection 155 has a similar valve 158. By adjustment of these valves, the degree of draft through the connections 154 and 155 and consequently the grade or size of reduced material separated, may be determined. A fan or other air current inducing apparatus 159 is connected to the dust collector by a suitable connection 160. This connection 160 has a valve 163 by means of which the draft therethrough may be regulated.

This type of apparatus operates in the following manner:

The larger pieces of material are separated from the stream of material being operated upon by the screen 126 and delivered thereby, to the upper end of the charging stack B. The material which passes through the mesh of the screen 126 is delivered to the gravity aspirator in which a still further separation takes place, the larger pieces of this lot being delivered by the connection 151, to the charging stack B at a point in advance of the point of delivery of the screen 126. The smaller pieces of this last mentioned lot together with what dust may be present, is introduced into the dust collector 153 wherein the dust is collected and a still further separation effected with the larger grades or sizes being delivered at 162 and the smaller pieces at 161. Through the medium of the chamber 156 and the connection 155, such dust as may be present in the charging stack B will be exhausted into the dust collector 153.

Figure 13:
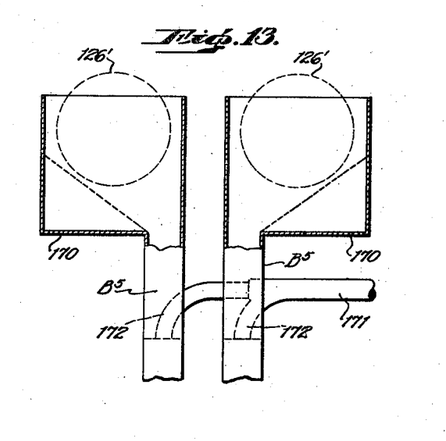
Figure 13 is a detail fragmentary sectional view partly in section illustrating a modified form of apparatus in which a plurality of charging stacks are fed with oversize material from individual screens.

Figure 13 illustrates a portion of an apparatus in which there are employed two charging stacks $B^5$, each of which is supplied with material by a revolving screen 126'. Each charging stack has a hopper-like structure 170 at its upper end and each screen 126' discharges oversize material into its respective hopper-like structure from which the material is discharged into the charging stacks $B^5$. The dust and material in the form of extreme fines is separated from the material being operated upon by a suitable air current induced through the pipe 171 and branches 172 which connect it to the charging stacks $B^5$.

Figure 14:
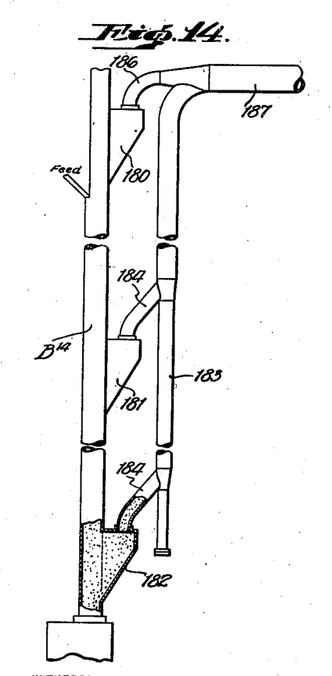
Figure 14 is a fragmentary view partly in elevation and partly in section illustrating a modified form of charging stack.

In some instances, it may be desirable to take off dust and extreme fines at more than one point in the length of the charging stack and in Figure 14 of the drawings, I have shown such an apparatus. Such an apparatus would include a charging stack $B^{14}$ having a plurality of expansion chambers 180, 181 and 182, arranged throughout its length and each having communication with the interior of the charging stack $B^{14}$. The reference character 183 designates a manifold to which the expansion chambers 181 and 182 are connected by branches 184. The manifold 183 has communication with a pipe 187 through which a current of air may be induced in any desired manner and the expansion chamber 180 has communication with the pipe 187 by means of a suitable connection 186.

From the foregoing it will be apparent that the present invention provides new and novel apparatus and methods of operation whereby the reduction of materials may be more efficiently accomplished than is possible with apparatus and methods heretofore generally employed.

While the invention has been herein illustrated and described in its preferred forms, it is to be understood that it is capable of other embodiments than those herein disclosed and that the invention is not to be limited to the embodiments herein set forth.

Having thus described the invention, what is claimed as new and what it is desired to secure by Letters Patent of the United States, is:

1. Apparatus for reducing and separating material including a reducing chamber, a charging stack through which the material is fed to the reducing chamber in a continuous stream, means for supplying material continuously to the charging stack, means for separating from the material, such material as has been reduced to desired size, means for grading the oversize material, and means for introducing different grades of oversize material to the charging stack at different points in the length thereof.

2. The method of reducing and separating material, which method includes elevating the material in a continuous stream to a critical height, precipitating said material from said critical height onto a breaking surface, repeating the operation, separating from the continuous stream such material as has been reduced to the desired degree, separating the oversize material into grades of different size and introducing said different grades of oversize material into the continuous stream at different points in the stream.

EDWIN G. STEELE.